(12) United States Patent
Sharp

(10) Patent No.: US 6,738,769 B2
(45) Date of Patent: May 18, 2004

(54) SORTING MULTIPLE-TYPED DATA

(75) Inventor: Frederick Thomas Sharp, Menlo Park, CA (US)

(73) Assignee: International Business Machines Corporation, Armonk, NY (US)

( * ) Notice: Subject to any disclaimer, the term of this patent is extended or adjusted under 35 U.S.C. 154(b) by 255 days.

(21) Appl. No.: 09/758,559

(22) Filed: Jan. 11, 2001

(65) Prior Publication Data

US 2002/0091691 A1 Jul. 11, 2002

(51) Int. Cl.⁷ .................................................. G06F 1/30
(52) U.S. Cl. ................................................. 707/7; 707/1
(58) Field of Search .............................. 707/7, 1, 509, 707/510, 102; 708/232

(56) References Cited

U.S. PATENT DOCUMENTS

| | | |
|---|---|---|
| 5,274,805 A | 12/1993 | Ferguson et al. |
| 5,287,494 A | 2/1994 | Garcia et al. |
| 5,355,478 A | 10/1994 | Brady et al. |
| 5,414,842 A | 5/1995 | Archer et al. |
| 5,680,607 A | 10/1997 | Brueckheimer |
| 5,765,167 A * | 6/1998 | Kiuchi et al. ............... 707/200 |
| 5,799,309 A | 8/1998 | Srinivasan |
| 5,924,091 A | 7/1999 | Burkhard |

FOREIGN PATENT DOCUMENTS

EP  0111689 A2  6/1984

OTHER PUBLICATIONS

Jun Hyun Park et al., Storing and searching of keys and separators in B+–tree, Journal of KISS, Dec. 1997, 568–580, vol. 3, No. 6, Korea Inf. Sci. Soc., South Koera.

Jon L. Bentley et al., Fast Algorithms for Sorting and Searching Strings, Proceedings of the Eight Annual ACM–SIAM Symposium on Discrete Algorithms, 1997, 360–369, ACM, USA.

Arne Andersson, Faster deterministic sorting and searching in linear space, Proceedings 37$^{th}$ Annual Symposium Foundations of Computer Science, 1996, 135–141, IEEE Comput. Soc. Process, Los Alamitos, CA, USA.

Arne Andersson, Sorting and Searching Revisited, Algorithm Theory—SWAT '96. 5$^{th}$ Scandinavian Workshop on Alogorithm Theory. Proceedings, 1996, 185–197, Dept. of Comput. Sci., Berlin, Germany.

Gennady Antoshenkov, Order Preserving String Compression, Proceedings of the Twelfth International Conference on Data Engineering, 1996, 655–663, IEEE Comput. Soc. Press, USA.

D.R. Hicks, Compressing Sort Keys While Maintaining Sort Sequence, IBM Technical Disclosure Bulletin, Jun. 1983, 388–391, vol. 26, No. 1, IBM, USA.

Allen P. Croft, DECO, Program, Jul. 1982, 158–170, vol. 16, No. 3, Unilever Computer Services, London, UK.

* cited by examiner

*Primary Examiner*—Alford Kindred
(74) *Attorney, Agent, or Firm*—Merle W. Richman, Esq.

(57) ABSTRACT

A sorting system and method that sorts records based on multiple fields by converting the fields to a common data type and sorting the common data type fields using a single sorting algorithm whereupon the records can be ordered based on the sorted common data type fields. The single sorting algorithm can quickly, efficiently, and accurately sort the records because the index fields have been converted to appropriate simple values in a common data type.

42 Claims, 2 Drawing Sheets

| Record Number | Name | | Date of Birth | Department No. | Annual Salary | Male/Female |
|---|---|---|---|---|---|---|
| 00 | Abe | Zebra | 04/04/1960 | 01 | 70,000.00 | M |
| 01 | Bea | Young | 02/02/1970 | 07 | 80,000.00 | F |
| 02 | Cecile | Wagner | 03/03/1959 | 02 | 55,000.00 | F |
| 03 | Daniel | Violete | 01/01/1980 | 09 | 45,000.00 | M |
| 04 | Edgar | Unger | 08/08/1978 | 03 | 67,000.00 | M |
| 05 | Fran | Tucker | 12/12/1973 | 02 | 81,000.00 | F |

SORTING MULTIPLE-TYPED DATA

BACKGROUND OF THE INVENTION

1. Field of the Invention

This invention relates to sorting systems and methods, and more particularly to multiple data type sorting systems.

2. Description of Related Art

To enable a user to efficiently view of a group of records, the user may request that the records be ordered or sorted based on one or more fields in each record. In a record the fields to be sorted may be different data types. For example, an employee database is shown in FIG. 1. The database includes a plurality of records where each record has six fields: name, date of birth, department number, annual salary, and sex (male/female). In this database each field is stored as a different data type. In particular, the name field is stored as a string data type, the date-of-birth field is a stored as a date data type, the department-number field is stored as an integer data type, the annual-salary field is stored as a double integer, and the sex field is stored as a Boolean data type.

In an object-oriented language, the data would be represented as instances of different classes; for example, in Java, the classes would be respectively, String, Date, Integer, BigDecimal, and Boolean. Even though all the data may be displayed as strings with readable characters, the data cannot be correctly ordered according to the numeric values of these characters. Otherwise, January would appear after February, and 2 would appear after 11. Therefore, data in a database or user-interface table is typically stored and sorted in appropriate data types instead of exclusively in the strings that represent their values to the user.

When a user requests the records of the employee database to be sorted, a sorting system invokes an algorithm to sort the records based on the selected fields . The sorting systems commonly invoke a different algorithm for each field data type to be sorted due to their different storage representations and sorting characteristics. Accordingly, when a user requests a group of records to be sorted based on fields of different data types, the sorting system may invoke different sorting algorithms to complete the ordering or sorting of the records. Depending on the number of records or fields, this technique can be processor intensive.

SUMMARY OF THE INVENTION

The present invention provides an efficient sorting system and method for sorting a plurality of records containing multiple-typed fields arranged in a plurality of columns. The records can be sorted based on the values in a selected subset of columns. The system generates a collation key for each field of the columns to be considered for sorting the records. Then the system sorts or orders the records based on the collation keys. The multiple columns may include at least two different data types. Further the collation keys generated by the system for the columns ideally have the same data type, such as an array of bytes. Then the system may use a common sorting algorithm to sort the records because the collation keys have the same data type.

The present invention may also sort records based on multiple fields by converting each of the multiple fields of the records to common data type fields. Then the invention orders the records based on the common data type fields. The multiple fields may include at least two different data types. Then the system may use a common sorting algorithm to sort the records because the common data type fields have the same data type. Further, the common data type fields are ideally arrays of bytes.

BRIEF DESCRIPTION OF THE DRAWINGS

Like reference numbers and designations in the various drawings indicate like elements.

DETAILED DESCRIPTION OF THE PREFERRED EMBODIMENTS

Throughout this description, the preferred embodiment and examples shown should be considered as exemplars, rather than as limitations on the present invention.

Figure 2:
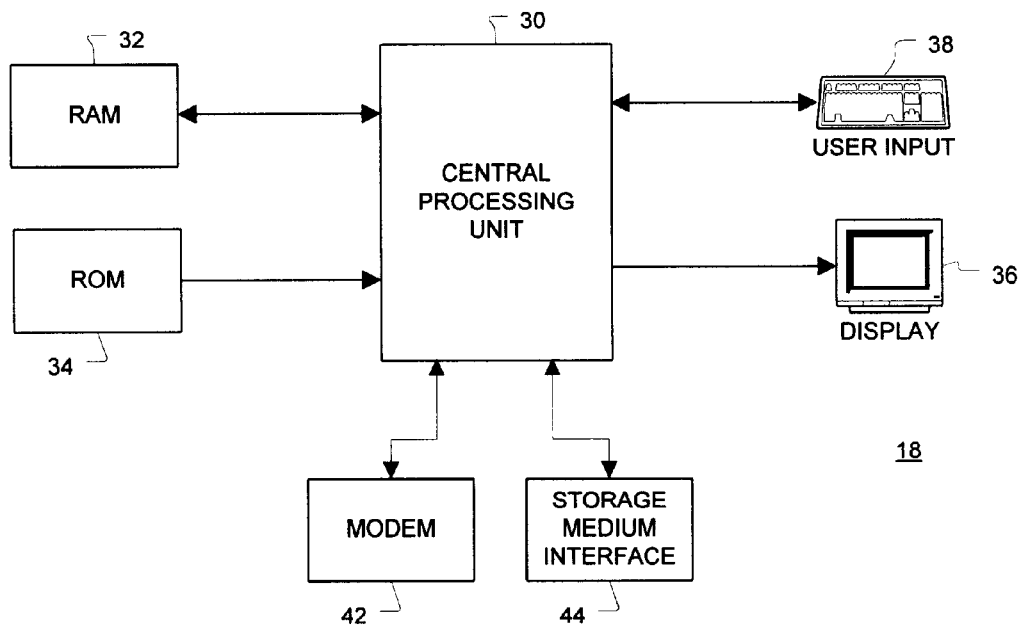
FIG. 2 is a block diagram of an embodiment of a processing system in accordance with the present invention.

A preferred embodiment of a processing system 18 that may be used to order records in accordance with the present invention is shown in FIG. 2. The processing system includes a Central Processing Unit ("CPU") 30 coupled to a Random Access Memory ("RAM") 32, a Read Only Memory ("ROM") 34, a display 36, a user input 38, a Modulator/Demodulator ("MODEM") 42, and a storage medium interface 44. The CPU 30 is a microprocessor such as a PowerPC, Intel®, AMD®, or Cyrix® microprocessor. The ROM 34 stores program instructions to be executed by the CPU 30. The RAM 32 stores data to be processed by the CPU 30 and program registers. The MODEM 42 may be coupled to a communications link and enables the CPU 30 to transceive data between another processor. The MODEM may be coupled to a plain old telephone system ("POTS"), local area network ("LAN"), or an Internet. The storage medium interface 44 enables the data transfers between the CPU 30 and a storage medium. The storage medium interface 44 may be any interface that enables communication between the CPU 30 and storage medium such as Small Computer System Interface ("SCSI"), Industry Standard Architecture ("ISA"), Peripheral Component Interconnect ("PCI"), and others. Accordingly, the CPU 30 may receive data including database records from a storage medium coupled to the storage medium interface 44 or via the MODEM 42 from almost any location.

The display 36 enables the CPU 30 to display data or information to a user in a human readable format. The display 36 may be any display device including a cathode ray tube ("CRT"), liquid crystal display ("LCD"), and others. The user input device 38 enables a user to provide instructions or requests to the CPU 30. The user input device 38 may be any input device including a keyboard, mouse, trackball, microphone for voice activated systems, touch based system coupled the display 36, and others. The user may request the CPU 30 to perform operations on database records including sorting a group of records based on one or more fields where the fields of the records are to be sorted.

Figures 1, 4:
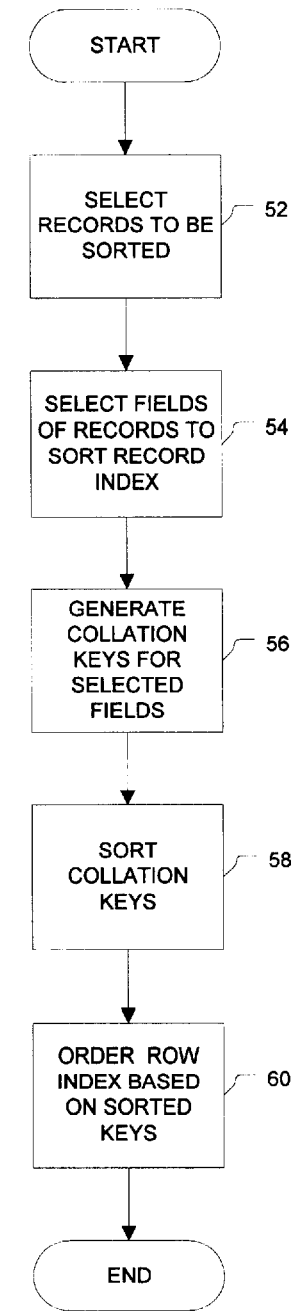
FIG. 1 is a diagram of an exemplary database that may be manipulated by the present invention.
FIG. 4 is a flow diagram of a method that may be performed by the processing system of present invention.

In order to sort a group of records of a table in a database or graphical user interface ("GUI") (such as the table shown in FIG. 1) based on multiple fields of each record, the CPU 30 generates a collation key for each selected field of each record. Each collation key represents the data of the associated field in a format that maintains the natural sorting order of the field. Each collation key also includes a pointer, an object reference, index value or the equivalent to the respective record. The CPU 30 then uses a sorting algorithm to sort the collation keys (and effectively the records of the table). The sorting algorithm may be any known sorting algorithm such a bubble sort algorithm or others. Then, the group of records of the database can be ordered based on the pointers, object references, or index values of the sorted collation keys. Accordingly, the group of records is effectively sorted by the selected fields of the records by the application of the sorted collation keys to the records.

For sorting multiple-type data using collation keys, the sorting logic or algorithm must handle collation keys for strings, sort false before true (Boolean types), sort large negative numbers before small negative numbers (integer or float types), and sort negative numbers before zero or positive numbers. Numbers are generally compared using numeric comparison operators such as "<" (less than), "=" (equal), and ">" (greater than). When dates and times are not internally represented as numbers, sorting logic must convert them to numbers to permit numeric comparison. The sorting logic is made more complex when fields may include the possibility of null values. Logic to test the data types of the collation keys and to select the appropriate conversions and comparisons diminishes the efficiency of the sorting.

Further, in multi-column sorting data in secondary columns or fields (and tertiary columns and so forth) must be compared. When two items in the previous column are equal, different comparisons must be made of another column or field. Preferably, the collation keys data type is the same for all selected fields regardless of the selected field data type. In prior art systems, when a user requests two or more of the records of the database shown in FIG. 1 to be sorted on multiple-typed fields, e.g., salary and name, a different sorting algorithm may be used to sort each field because the fields have different data types; the salary field is double integer data type and the name field is a string data type. Accordingly, an integer data type sorting algorithm may be employed to sort the salary field and a string data type sorting algorithm may be used to sort the name field. In the invention, the CPU 30 generates a collation key for each salary and name value in the records of the database to be sorted. In the preferred embodiment the collation keys representing the salary values have the same data type as the collation keys representing the name values. Preferably each collation key is an array of bytes.

Figure 3:
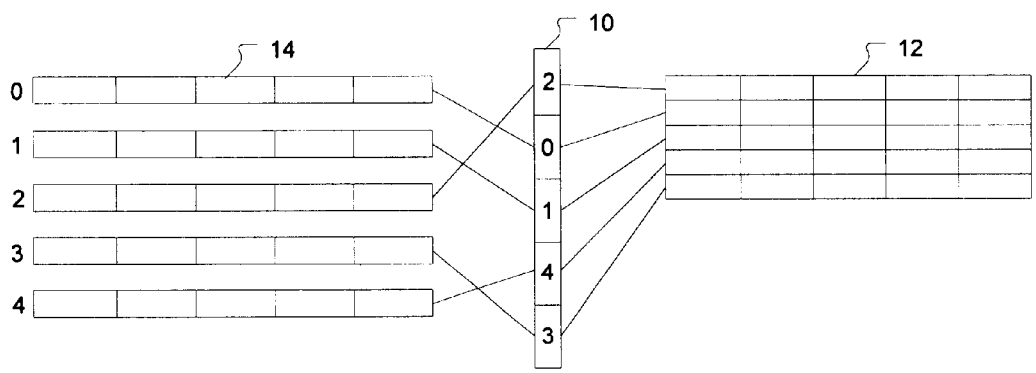
FIG. 3 is a representation of a process of sorting a group of records to be displayed in a table via a row index for the table according to an embodiment of the present invention.

When the collation keys representing different selected fields of a record have the same data type, a single or common sorting algorithm can be employed to sort all the collation keys. The records are ordered based on the sorted collation keys where each collation key includes a pointer, an object reference, or an index value to a respective record. This may reduce the time required to effectively sort multiple fields of records. FIG. 3 is a representation of a process shown in FIG. 4 of sorting a group of records to be displayed in a table via a row index for the table according to an embodiment of the present invention. A user may select a group of rows in a table 12 (that represents records of a database 14) to be sorted (step 52). The user may then select columns of the table 12 (that represent fields of the records of the database 14) to be sorted (step 54). As shown in FIG. 3, each row of the table 12 corresponds to a record 14 where the records 14 are displayed in the rows of the table 12 based on the row index 10. These steps, 52 and 54 may be performed in conjunction with a user or other mechanism that cooperates with a CPU 30 to select the records and select fields.

Collation keys are generated for each column (field) of each row (record) of the table 12 (database 14) to be sorted (at step 56). Ideally, the collation keys have one data type, in particular, an array of bytes regardless of the data types of the selected columns (fields). In this embodiment, the collation keys are generated by converting the selected column (field) values to array values based on rules that vary as a function of the data type of the index field. After the collation keys are generated, the keys are sorted (step 58). The collation keys may be sorted using a common sorting algorithm given the collation keys are commonly typed. The records then are effectively ordered based on the sorted collation keys (step 60) by sorting the row index 10 based on the collation keys in one embodiment. Each collation key includes a pointer, an object reference, or an index value to a corresponding record so the records can be ordered based on the sorted pointers, object references, or index values.

Many different methods or algorithms may be employed to convert all selected fields (or columns) to common data type collation keys. Even where the column data type is string, special treatment may be required to preserve the correct character order for the national language of the user. In particular, the character order may be different from the order of the numeric American Standard Code for Information Interchange ("ASCII") values that represent the characters. For example, in ASCII, "A" is 65, "B" is 66, however, "A-grave" is 193. When sorting characters normally A-grave should sort between A and B. Sorting the numeric value that represents characters, "A-grave" would sort well after "B", not before "B". Therefore, a collation key may be ideally generated even for string data type fields.

For example, the collation keys for strings may be generated based on language-specific rules. To create a collation key, the CPU 30 applies ordering rules for the language to the string data and selects a sequence of characters that can be appropriately ordered in place of the original string. In detail, the CPU 30 applies the ordering rules to the numeric values of the characters of the string considered from left to right to generate a collation key. For a national language that is written right to left, the string would still be considered from left to right.

In one embodiment, the CPU 30 generates collation keys for String, null, Boolean, Date (including time values), BigDecimal, BigInteger, Float, Double, Long, Integer, and Short where the resultant collation keys are all string data and may be sorted by the same comparison or sorting algorithm. For string data types (fields having string values), the CPU 30 employs a rule based collator based on the locale (to determine national language characteristics). The CPU 30 generates collation keys for the other data types by getting their display values and applying data type based rules to the resultant strings.

Based on the rules, the CPU 30 preferably generates collation keys so: 1) null values sort before everything else; 2) false sorts before true for Boolean type data; 3) earlier dates and times sort before later dates and times for time/date types; 4) large negative numbers sort before small negative numbers and negative numbers sort before zero or positive numbers for integer data; 5) negative infinity sorts before the largest negative number, negative zero sorts just before zero, infinity sorts after the largest positive number, and non-numeric values sort last for float type data.

In one preferred embodiment, the rules to be executed by a CPU 30 are implemented in Java where the Java code is used for sorting values in two-dimensional tables in which each column may display values of a different data type. The Java implementation is in the following classes and with the following rules:

AssistKey:

1) Keeps a source index and a sortable key, which is a byte array.

2) Implements a compareTo method that lets each AssistKey compare itself to another AssistKey, returning an integer that is negative if this AssistKey is less than the other, zero if equal, and positive if greater than.

3) The compareTo method compares the numeric values of the bytes in the two byte arrays from left to right.

4) After the AssistKeys are sorted, their index values provide access to the original data.

AssistCollator:

1) Creates AssistKeys not only for String, but also Boolean, Short, Integer, Long, Float, Double, BigInteger, BigDecimal, and null data.

2) When constructed, an AssistCollator can be provided with a Locale. Otherwise, it uses the default Locale. This Locale lets AssistCollator construct an appropriate RuleBasedCollator, named "delegate," that can generate a CollationKey for a String.

3) AssistCollator.getByteArray(Object) methods exist for each data type.

Object:

1) For null, returns a byte array for the minimum long value.

2) For a known type, returns getByteArray for the known type.

3) Otherwise, gets the displayable String for the object and returns getByteArray(String).

String:

1) For null, returns a byte array for the minimum long value.

2) Otherwise, gets a CollationKey from the delegate and return its byte array.

Boolean:

1) For null, returns a byte array for the minimum long value.

2) Otherwise, returns a one-byte array. The value of its only byte is 1 if the Boolean value is false, and 2 if true.

Date:

1) For null, returns a byte array for the minimum long value.

2) Otherwise, gets the long value of the Date and returns getByteArray(Long).

BigInteger:

1) For null, returns a byte array for a BigDecimal smaller than the minimum decimal value that can be stored.

2) If the value is 0, returns a one-byte array. The value of its only byte is 2.

3) If the value is negative, gets the complement by adding a number larger than the maximum decimal value that can be stored.

4) Gets an N-byte array containing the big-endian, two's-complement representation of the number.

5) Returns a byte array with N+1 bytes, whose first byte represents the sign with a value of 1 if the number is negative, and 3 if positive, and whose remaining bytes contain the bigendian, two's-complement representation of the number.

BigDecimal:

1) For null, returns a byte array for a BigDecimal smaller than the minimum decimal value that DB2 can store.

2) If the value is 0, returns a one-byte array. The value of its only byte is 2.

3) If the value is negative, calculates the fractional part and the complement of the whole part. Shifts the decimal point of the fractional part to the right by the scale (the number of digits to the right of the decimal point). The complement is the whole part subtracted from a number larger than the maximum decimal value that can be stored.

4) For positive values, calculates the fractional and whole parts. Shifts the decimal point of the fractional part 31 positions to the right where 31 positions are the maximum decimal precision in the exemplary database.

5) Gets an N-byte array containing the big-endian, two's-complement representation of the whole part, and an F-byte array containing the big-endian, two's-complement representation of the fractional part. Returns a byte array with N+F+1 bytes, whose first byte represents the sign with a value of 1 if the number is negative, and 3 if positive, and whose remaining bytes contain the big-endian, two's-complement representation of the whole part, padded to 12 bytes by zeros, followed by the shifted fractional part.

Float:

1) For null, returns a byte array for the minimum single-precision floating-point value.

2) Otherwise, considers the IEEE-754 "single-precision" bit layout of the 4-byte number, in which the sign is in the first bit, position 31, in which the exponent is 8 bits in positions 30–23, and in which the mantissa (significand) is 23 bits in positions 22–0.

3) If the value is −0, adds 1.

4) If the value is 0, returns a one-byte array. The value of its only byte is 2.

5) Otherwise, returns an array of 6 bytes.

6) Byte 0 represents the sign with a value of 1 if the number is negative, and 3 if positive.

7) If the value is negative, flips the bits of the exponent and mantissa.

8) Bytes 1 and 2 of the returned array contain the exponent, and bytes 3 through 5 contain the mantissa.

Double:

1) For null, returns a byte array for the minimum double-precision floating-point value.

2) Otherwise, considers the IEEE-754 "double-precision" bit layout of the 8-byte number, in which the sign is in the first bit, position 63, in which the exponent is 11 bits in positions 62–52, and in which the mantissa (significand) is 52 bits in positions 51–0.

3) If the value is −0, adds 1.

4) If the value is 0, returns a one-byte array. The value of its only byte is 2.

5) Otherwise, returns an array of 10 bytes.

6) Byte 0 represents the sign with a value of 1 if the number is negative, and 3 if positive.

7) If the value is negative, flips the bits of the exponent and mantissa.

8) Bytes 1 and 2 of the returned array contain the exponent, and bytes 3 through 9 contain the mantissa.

Long:

1) For null, returns a byte array for the minimum long value.

2) If the value is 0, returns a one-byte array. The value of its only byte is 2.

3) Otherwise, returns an array of 9 bytes.

4) Byte 0 represents the sign with a value of 1 if the number is negative, and 3 if positive.

5) If the value is negative, flip the value (resulting in the absolute value minus 1) and subtract this from the maximum long value.

6) Bytes 1 through 8 contain the positive value.

Integer:

1) For null, returns a byte array for the minimum integer value.

2) If the value is 0, returns a one-byte array. The value of its only byte is 2.

3) Otherwise, returns an array of 5 bytes.

4) Byte 0 represents the sign with a value of 1 if the number is negative, and 3 if positive.

5) If the value is negative, flip the value (resulting in the absolute value minus 1) and subtract this from the maximum integer value.

6) Bytes 1 through 4 contain the positive value.

Short:

1) For null, returns a byte array for the minimum short value.

2) If the value is 0, returns a one-byte array. The value of its only byte is 2.

3) Otherwise, returns an array of 3 bytes.

4) Byte 0 represents the sign with a value of 1 if the number is negative, and 3 if positive.

5) If the value is negative, flip the value (resulting in the absolute value minus 1) and subtract this from the maximum short value.

6) Bytes 1 through 2 contain the positive value.

While this invention has been described in terms of a best mode for achieving this invention's objectives, it will be appreciated by those skilled in the art that variations may be accomplished in view of these teachings without deviating from the spirit or scope of the present invention. For example, the present invention may be implemented using any combination of computer programming software, firmware or hardware (e.g., a software language other than Java, such as C++ or others may be used to implement the invention). As a preparatory step to practicing the invention or constructing an apparatus according to the invention, the computer programming code (whether software or firmware) according to the invention will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the computer programming code is used by either executing the code directly from the storage device, by copying the code from the storage device into another storage device such as a hard disk, RAM, etc. or by transmitting the code on a network for remote execution.

What is claimed is:

1. A method of sorting a plurality of records, comprising the steps of:

a) enabling the selection of fields of the plurality of records to be sorted;

b) generating a collation keys for the selected fields of the plurality of records; and c) sorting the collation keys and ordering the selected fields of the plurality of records based on the sorted collation keys.

2. The method of sorting a plurality of records of claim 1, wherein the selected fields includes at least two different data storage types.

3. The method of sorting a plurality of records of claim 2, wherein the collation keys generated for the selected fields have the same data storage type.

4. The method of sorting a plurality of records of claim 3, wherein the data storage type of the collation keys is an array of bytes.

5. The method of sorting a plurality of records of claim 1, wherein step c) includes sorting the collation keys using a common sorting algorithm.

6. A method of sorting a first field and a second field of a plurality of records, comprising the steps of:

a) generating a first collation keys for the first field of the plurality of records;

b) generating a second collation keys for the second field of the plurality of records; and c) sorting the first collation keys and the second collation keys and ordering the first field and the second field of the plurality of records based on the sorted first collation keys and the second sorted collation keys.

7. The method of sorting a first field and a second field of a plurality of records of claim 6, wherein the first field and the second field have different data storage types.

8. The method of sorting a first field and a second field of a plurality of records of claim 7, wherein the first collation keys and the second collation keys have the same data storage type.

9. The method of sorting a first field and a second field of a plurality of records of claim 8, wherein the data storage type of the collation keys is an array of bytes.

10. The method of sorting a first field and a second field of a plurality of records of claim 8, wherein step c) includes sorting the first collation keys and the second collation keys using a common sorting algorithm.

11. An article of manufacture for use in sorting a plurality of records, the article of manufacture comprising computer readable storage media including program logic embedded therein that causes control circuitry to perform the steps of:

a) enabling selection of fields of the plurality of records to be sorted;

b) generating a collation key for the selected fields of the plurality of records; and c) sorting the collation keys and ordering the selected fields of the plurality of records based on the sorted collation keys.

12. The article of manufacture for use in sorting a plurality of records of claim 11, wherein the second plurality of selected fields includes at least two different data storage types.

13. The article of manufacture for use in sorting a plurality of records of records of claim 12, wherein the collation keys generated for the selected fields have the same data storage type.

14. The article of manufacture for use in sorting a plurality of records of claim 13, wherein the data storage type of the collation keys is an array of bytes.

15. The article of manufacture for use in sorting a plurality of records of claim 13, wherein step c) includes sorting the collation keys using a common sorting algorithm.

16. An article of manufacture for use in sorting a first field and a second field of a plurality of records, the article of manufacture comprising computer readable storage media including program logic embedded therein that causes control circuitry to perform the steps of:
- a) generating first collation keys for the first field of the plurality of records;
- b) generating second collation keys for the second field of the plurality of records; and
- c) sorting the first collation keys and the second collation keys and ordering the first field and the second field of the plurality of records based on the first sorted collation keys and the second sorted collation keys.

17. The article of manufacture for use in sorting a first field and a second field of a plurality of records of claim 16, wherein the first field and the second field have different data storage types.

18. The article of manufacture for use in sorting a first field and a second field of a plurality of records of claim 17, wherein the first collation keys and the second collation keys have the same data storage type.

19. The article of manufacture for use in sorting a first field and a second field of a plurality of records of claim 18, wherein the data storage type of the collation keys is an array of bytes.

20. The article of manufacture for use in sorting a first field and a second field of a plurality of records of claim 18, wherein step c) includes sorting the first collation keys and the second collation keys using a common sorting algorithm and ordering the plurality of records based on the sorted first and second collation keys.

21. An apparatus for sorting a plurality of records, comprising:
- a) means for enabling the selection of fields of the plurality of records to be sorted;
- b) means for generating a collation keys for the selected fields of the plurality of records; and
- c) means for sorting the collection keys and ordering the selected fields of the plurality of records based on the sorted collation keys.

22. The apparatus for sorting a plurality of records of claim 21, wherein the selected fields includes at least two different data types.

23. The apparatus for sorting a plurality of records of claim 22, wherein the collation keys generated for the selected fields have the same data storage type.

24. The apparatus for sorting a plurality of records of claim 23, wherein the data storage type of the collation keys is an array of bytes.

25. The apparatus for sorting a plurality of records of claim 23, wherein the means for sorting the collection keys and ordering and the selected fields of the plurality of records includes means for sorting the collation keys using a common sorting algorithm.

26. An apparatus for sorting a first field and a second field of a plurality of records, comprising:
- a) means for generating first collation keys for the first field of the plurality of records;
- b) means for generating second collation keys for the second field of the plurality of records; and
- c) means for sorting the first collation keys and second collation keys and ordering the first field and the second field of the plurality of records based on the first sorted collation keys and the second sorted collation keys.

27. The apparatus for sorting a first field and a second field of a plurality of records of claim 26, wherein the first field and the second field of the records have different data storage types.

28. The apparatus for sorting a first field and a second field of a plurality of records of claim 27, wherein the first collation keys and the second collation keys have the same data storage type.

29. The apparatus for sorting a first field and a second field of a plurality of records of claim 28, wherein the data storage type of the collation keys is an array of bytes.

30. The apparatus for sorting a first field and a second field of a plurality of records of claim 28, wherein the means for sorting the first collation keys and the second collation keys and ordering the first field and the second field includes means for sorting the first collation keys and the second collation keys using a common sorting algorithm.

31. A method of sorting a plurality of records, comprising the steps of:
- a) enabling the selection of fields of the plurality of records to be sorted;
- b) converting the data storage type of the selected fields of the plurality of records to a common data storage type; and
- c) sorting the converted common data storage type fields and ordering the selected fields of the plurality of records based on the sorted common data storage type fields.

32. The method of sorting a plurality of records of claim 31, wherein the selected fields includes at least two different data storage types.

33. The method of sorting a plurality of records of claim 32, wherein the common data storage type is an array of bytes.

34. The method of sorting a plurality of records of claim 32, wherein step c) includes sorting the common data storage type fields using a common sorting algorithm.

35. An article of manufacture for use in sorting a plurality of records, the article of manufacture comprising computer readable storage media including program logic embedded therein that causes control circuitry to perform the steps of:
- a) enabling the selection of fields of the plurality of records to be sorted;
- b) converting the data storage type of the selected fields of the plurality of records to a common data storage type; and
- c) sorting the converted common data storage type fields and ordering the selected fields of the plurality of records based on the sorted common data storage type fields.

36. The article of manufacture for use in sorting a first-plurality of records of claim 35, wherein the selected fields includes at least two different data storage types.

37. The article of manufacture for use in sorting a plurality of records of claim 36, wherein the common data storage type is an array of bytes.

38. The article of manufacture for use in sorting a plurality of records of claim 37, wherein step c) includes sorting the common data storage type fields using a common sorting algorithm.

39. An apparatus for sorting a plurality of records, comprising:
- a) means for enabling the selection of fields of the plurality of records to be sorted;

b) means for converting the data storage type of the selected fields of the plurality of records to a common data storage type; and c) means for sorting the converted common data storage type fields and ordering the selected fields of the plurality of records based on the sorted common data storage type fields.

40. The apparatus for sorting a plurality of records of claim 39, wherein the selected fields includes at least two different data storage types.

41. The apparatus for sorting a plurality of records of claim 40, wherein the common data storage type is an array of bytes.

42. The apparatus for sorting a plurality of records of claim 41, wherein the means for sorting the converted common data storage type fields and ordering the selected fields of the plurality of records includes means for sorting the common data storage type fields using a common sorting algorithm.

* * * * *

UNITED STATES PATENT AND TRADEMARK OFFICE
CERTIFICATE OF CORRECTION

PATENT NO. : 6,738,769 B2  Page 1 of 1
DATED : May 18, 2004
INVENTOR(S) : Sharp

It is certified that error appears in the above-identified patent and that said Letters Patent is hereby corrected as shown below:

Column 7,
Line 66, after "generating", delete "a".

Column 8,
Line 5, after "fields", ,after "fields", delete "includes", and insert therefor -- include --.
Lines 19 and 21, after "generating", delete "a".
Line 59, after "wherein", delete "the second plurality".

Column 9,
Line 38, after "generating", delete "a".

Column 10,
Line 3, delete "includes", and insert therefor --include --.
Line 39, after "fields", delete "includes", and insert therefor -- include --.
Lines 54 and 56, after "a", delete "first-".

Column 11,
Line 9, after "fields", delete "includes", and insert therefor -- include --.

Signed and Sealed this

Seventeenth Day of August, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,738,769 B2
DATED : May 18, 2004
INVENTOR(S) : Sharp

It is certified that error appears in the above-identified patent and that said Letters Patent is hereby corrected as shown below:

Column 8,
Line 55, after "wherein", delete "the second plurality".
Line 56, after "fields", delete "includes", and insert therefore -- include --.

Column 10,
Lines 32 and 56, delete "includes", and insert therefore --include --.

Signed and Sealed this

Twenty-third Day of November, 2004

JON W. DUDAS
*Director of the United States Patent and Trademark Office*